United States Patent [19]

Villareal

[11] 4,425,744
[45] Jan. 17, 1984

[54] SYSTEM OF FLOOD PROTECTION FOR BUILDINGS

[76] Inventor: Carlos Villareal, 813 Bledsoe #12, Lufkin, Tex. 75901

[21] Appl. No.: 290,398

[22] Filed: Aug. 5, 1981

[51] Int. Cl.³ .............................................. E04H 9/14
[52] U.S. Cl. ................................... 52/169.14; 52/202; 160/25
[58] Field of Search ............. 52/169.14, 169.12, 169.5, 52/202, DIG. 3; 160/1, 19, 25, 26, 83, 241

[56] References Cited

U.S. PATENT DOCUMENTS

| | | | |
|---|---|---|---|
| 2,668,586 | 2/1954 | Luckie | 160/241 |
| 3,186,473 | 6/1965 | Myers et al. | 160/241 X |
| 3,306,344 | 2/1967 | Youngs | 160/241 |
| 3,476,034 | 11/1969 | Ulich | 160/25 X |
| 3,793,795 | 2/1974 | Annand | 52/169.14 X |
| 3,796,249 | 3/1974 | McCabe | 160/1 |
| 4,019,304 | 4/1977 | Timm | 52/202 X |
| 4,321,774 | 3/1982 | Fish | 52/169.14 X |

FOREIGN PATENT DOCUMENTS 516051  1/1972  Switzerland .................... 52/169.14

Primary Examiner—J. Karl Bell
Attorney, Agent, or Firm—Neal J. Mosely

[57] ABSTRACT

A system of flood protection for buildings having a foundation which is not permeable to water consists of a lower continuous skirt of plastic film secured by a waterproof seal to the foundation and an upper continuous skirt of plastic film secured to an upper level of the building above the maximum projected rise of flood waters. Both the lower continuous skirt and the upper continuous skirt extend completely around the building and are of a size and shape permitting each skirt to be unfolded or unwound to meet the other. The edges of each skirt have suitable waterproof sealing means, such as a zip-lock seal, permitting the skirts to be sealed together in water proof relation to protect the building against rising waters. Upper and lower peripheral enclosures are provided on the building in which the upper and lower continuous plastic film skirts are stored when not in use.

11 Claims, 6 Drawing Figures

U.S. Patent  Jan. 17, 1984  Sheet 1 of 2  4,425,744
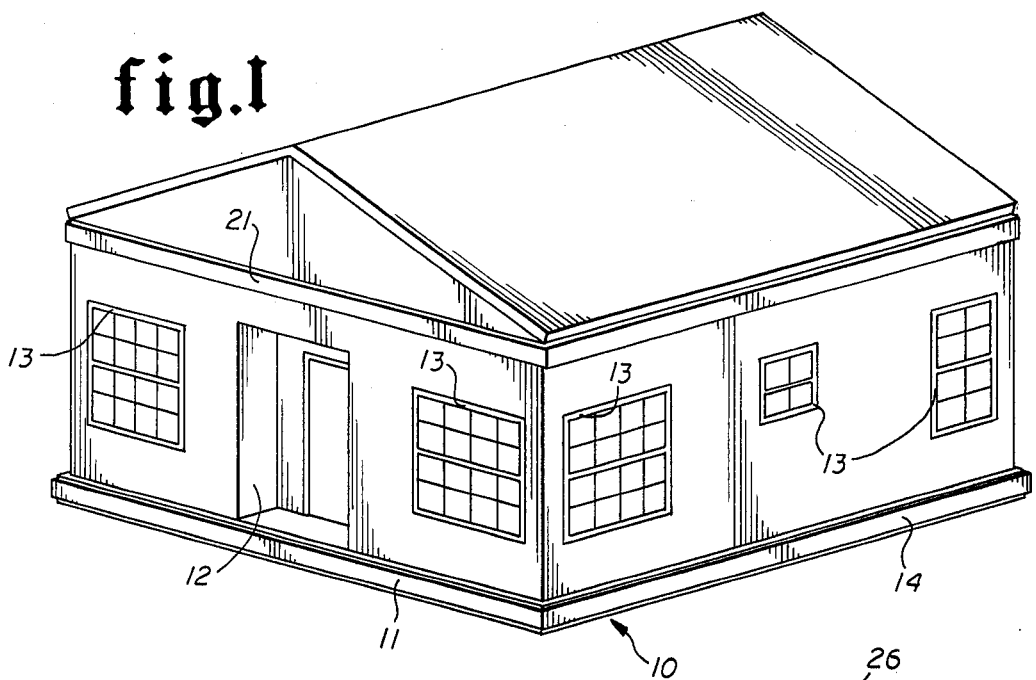
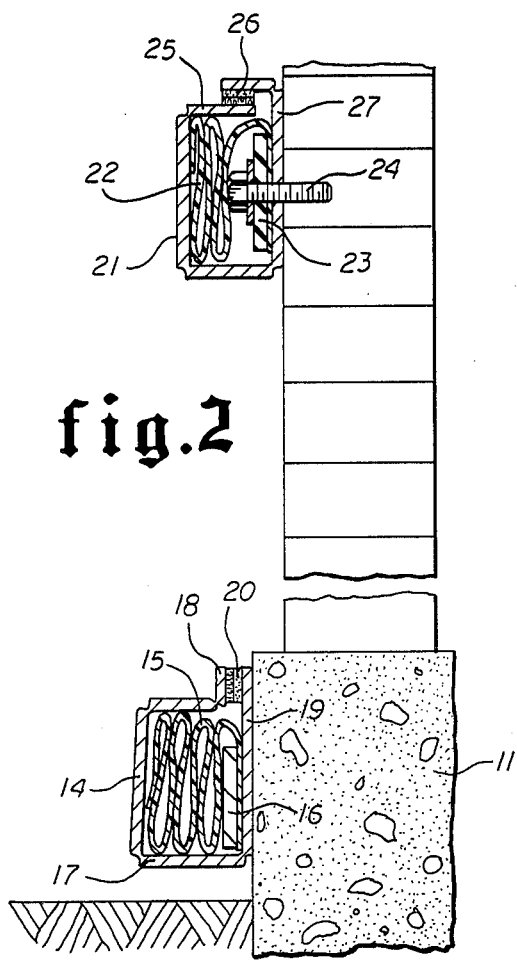
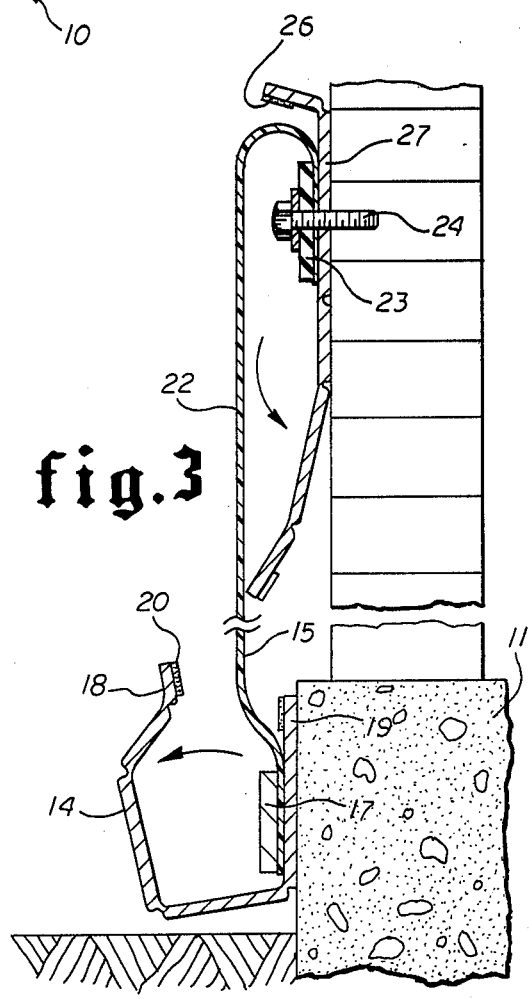

SYSTEM OF FLOOD PROTECTION FOR BUILDINGS

BACKGROUND OF THE INVENTION

1. Field of the Invention

This invention relates to new and useful improvements in systems or apparatus for protection of buildings from flooding.

2. Brief Description of the Prior Art

In the past, protection of buildings from floodings has been primarily accomplished by dikes or levies or the like. Also, temporary protection has been provided for buildings by construction of temporary dikes or levies by means of sandbags and the like. Buildings have been protected from overhead water by coverings but no satisfactory means has been provided for protection of buildings for short periods of time against rapidly rising flood waters.

Canopies and shields of canvas or of plastic film are known in the prior art for overhead protection of various structures.

Vaniman U.S. Pat. No. 1,057,366 discloses an overhead covered protection for housing dirigibles.

Sharbondy U.S. Pat. No. 1,279,596 discloses an overhead canvas or plastic film protection for motor vehicles.

Lacey U.S. Pat. No. 1,888,497 discloses canvas covers for open sided structures for supporting hay or grain. The canvas surrounds the structure to protect it from the weather.

Dakin U.S. Pat. No. 1,648,724 discloses an overhead canvas type enclosure for protecting the exterior of a building under construction from rain and other inclement weather.

Smith U.S. Pat. No. 3,323,530 discloses overhead and side canvas or plastic film protection from the weather in the form of a sportman's blind.

Travis U.S. Pat. No. 3,503,566 discloses a plastic film or canvas canopy supported on a building to protect the same against weather.

Now of this prior art is concerned with the protection of buildings against damage by rising flood waters.

SUMMARY OF THE INVENTION

One of the objects of this invention is to provide a new and improved system or apparatus for protection of buildings from flood waters.

Another object of this invention is to provide an improved system or apparatus for protection of buildings from flooding by means of a peripheral, vertically extending plastic skirt sealed to the foundation of the building and protecting against intrusion of water up to a height greater than the projected rise of flood waters.

Another object of this invention is to provide a new and improved system or apparatus for protecting buildings from flood waters, where the building has a foundation which is not permeable to water, which consists of separate upper and lower continuous skirts of plastic film surrounding the building, the lower skirt being sealed to the foundation and the upper skirt being supported at an upper level of the building, the skirt being secured together by a releasable waterproof peripheral seal.

Other objects of this invention will become apparent from time to time throughout the specification and claims as hereinafter related.

The above objects and other apparent objects of the invention are accomplished by a system of flood protection for buildings having a foundation which is not permeable to water which consists of a lower continuous skirt of plastic film secured by a waterproof seal to the foundation and an upper continuous skirt of plastic film secured to an upper level of the building above the maximum projected rise of flood waters. Both the lower continuous skirt and the upper continuous skirt extend completely around the building and are of a size and shape permitting each skirt to be unfolded or unwound to meet the other. The edges of each skirt have suitable releasable waterproof sealing means, such as a zip-lock seal, permitting the skirts to be sealed together in water proof relation to protect the building against rising waters. Upper and lower peripheral enclosures are provided on the building in which the upper and lower continuous plastic film skirts are stored when not in use.

BRIEF DESCRIPTION OF THE DRAWINGS

FIG. 1 is an isometric view of a building provided with a system or apparatus for flood protection representing a preferred embodiment of this invention.

FIG. 2 is a sectional view of a portion of the building shown in FIG. 1, illustrating the enclosures for the flood protecting skirts for the building.

FIG. 3 is a sectional view of the building of FIG. 1 showing the flood protecting skirts in position for protection against flood waters.

DESCRIPTION OF THE PREFERRED EMBODIMENT

Figure 4:
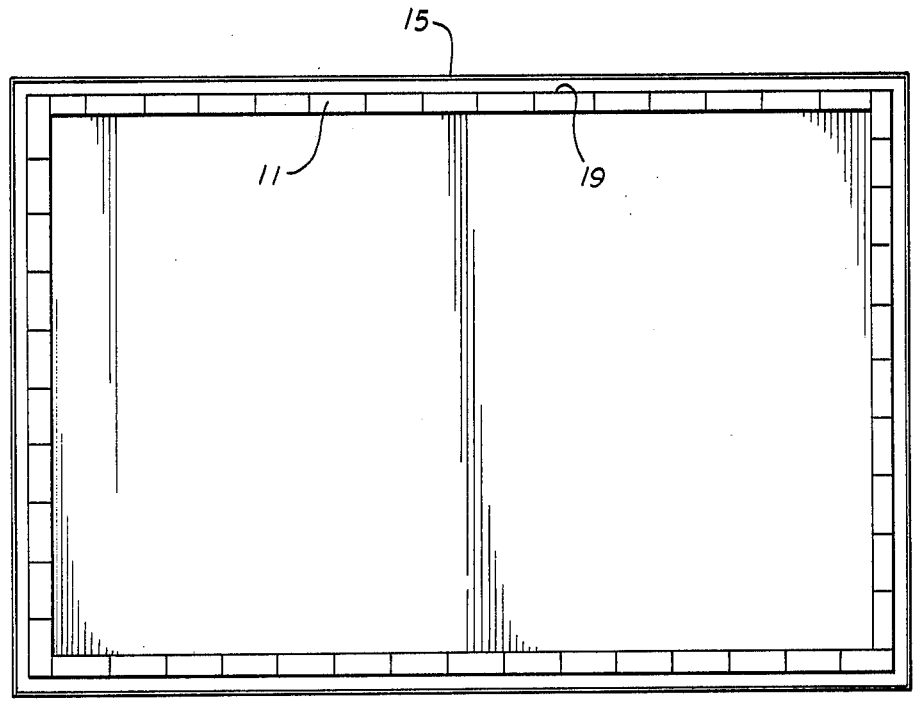
FIG. 4 is a sectional, plan view of the building in FIG. 1 showing the relationship of the flood protecting skirt to the foundation of the building.

This is a system or apparatus for protecting buildings temporarily from flooding. In FIG. 1, there is shown an isometric view of a building 10 provided with the flood protecting system or apparatus representing a preferred embodiment of this invention. Building 10 has a foundation 11 of concrete or other material which is impervious to water. The building shown is for purposes of illustration only and is to be considered exemplary of the application of the invention to any building.

The building is shown as having a front door 12 and a plurality of windows 13 positioned therearound. At the base of building 10, and surrounding the foundation 11, there is provided a continuous enclosure 14 in which part of the flood protection system or apparatus is stored. The enclosure 14 encloses a lower continuous skirt 15 of plastic film, or the like, which is preferably accordion pleated and supported within enclosure 14 and extending continuously around the foundation. One continuous edge of lower skirt 15 is secured to foundation 12 as indicated at 16 by a waterproof seal. The plastic film skirt 15 is sealed to foundation 11 using a plastic adhesive or other sealing agent and by a sealing strip 17 which may be fastened to foundation 11 by any suitable fasteners (not shown). Enclosure 14 is channel shaped in construction and preferably has a lid portion 18 which is releasably secured to a base portion 19 as indicated at 20 by a suitable securing means such as Vel-Cro or by a pressure sensitive adhesive or the like.

At the upper level of the building 10, above the level of the windows 13 and above the maximum level of projected rise of flood waters, there is shown an enclosure 21 extending completely around the building and enclosing a peripherally extending upper plastic film skirt which cooperates with the lower plastic film skirt 15 to provide a waterproof enclosure for the building. Upper plastic film skirt 22 is supported in enclosure 21 and extends substantially completely around building 10. Plastic film skirt 22 is secured to the upper portion of the building 10 by a waterproof connection as indicated at 23 and is secured in place by screws or bolts 24 or the like. Enclosure 21 is of a channel shaped construction and has a lid portion 25 which is secured by a releasable joint 26 to the base portion 27 supported on building 10.

Upper plastic film skirt 22 and lower plastic film skirt 15 both extend substantially completely around building 10 and at one edge are secured in watertight or waterproof relation to the upper portion of the building and to the foundation, respectively. The upper skirt 22 is accordion pleated and supported in upper enclosure 21 and extends substantially completely around building 10. The lower plastic film skirt 15 is likewise accordion pleated and secured in enclosure 14 extending substantially completely around foundation 11.

Upper plastic film skirt 22 extends around the building 10 and has a gap or opening 28 located adjacent to one of the windows 13 or to the door 12 of the building to permit access at the time the flood protection system is being implemented. The gap or opening at 28 also functions to allow the upper flood protecting skirt 22 to be stretched during unfolding or unpleating. If the gap or opening 28 were not provided, it would be difficult to unwind or unfold or unpleat the upper protecting skirt at the time its use was required. When the upper protecting skirt 22 is lowered, it completely surrounds the building as a continuous protection except for the gap or opening 28.

The lower protecting skirt 15 completely surrounds the foundation portion of the building and extends upward therefrom to meet the lowermost, downwardly extending edge of upper protecting skirt 22. The lower skirt 15 completely surrounds the foundation and has an outwardly projecting portion or tongue 29 which extends up into and fills the gap 28 at the time the flood protecting system is implemented.

Figure 5:
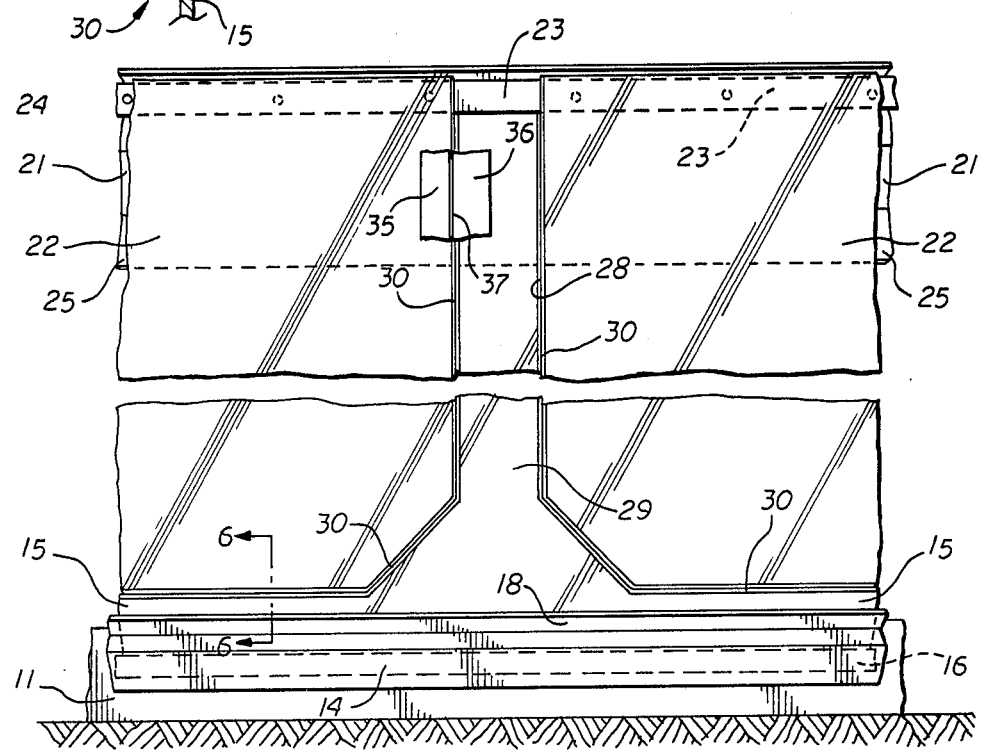
FIG. 5 is a detail view of the flood protecting skirts when assembled to protect the building against flooding.

When upper protecting skirt 22 is lowered to the position shown in FIG. 5 and lower protecting skirt 15 and projecting tongue 29 is raised as shown in FIG. 5, the edges of these skirts are secured together in a watertight or waterproof seal. The waterproof seal is preferably accomplished by means of a tongue-in-groove seal of the type used in some packaging films and known as a ZIP-LOCK construction. The seal 30 which joins the upper film or skirt 22 to the lower film or skirt 15 is illustrated in detail in section in FIG. 6. In this view, it is seen that the upper edge portion of the lower plastic film skirt 15 is provided with a continuous groove 31 into which it fits continuous tongue or rib 32 of the lower edge portion of the upper plastic film skirt 22. This tongue-in-groove seal or joint 30 is one which is easily and quickly assembled by bringing the edges of the skirts 22 and 15 together and pressing tongue or rib 32 into groove 31. This can be done rapidly around the entire building and the assembly is completed when the seal is effected along the vertically extending tongue or insert portion 29 of the lower plastic film skirt 15. In addition, there is preferably provided a pair of reinforcing strips 35 and 36 (only partially shown) extending all along the length of joints 28 and 30, which are connectable by edge zipper 37. This zipper 37 is provided to give physical strength to the joints 28 and 30 to prevent separation by wind or other forces.

OPERATION

The operation of this flood protection system or apparatus should be obvious from the foregoing description but will restated for clarity and greater understanding of the application of this invention.

Prior to any danger of flooding, the flood protection apparatus is in position on building 10 as illustrated in FIG. 1. Upper flood protection skirt 22 is accordion pleated (or could be rolled if desired) into the position shown in FIG. 2 and is enclosed by the peripheral enclosure 21. The lower flood protecting skirt 15 extends around foundation 11 and is folded in the position shown in FIG. 2 in peripherally extending enclosure 14.

When there is danger of flooding, upper enclosure 21 is opened completely around the building to the position shown in FIG. 3 which allows upper protective skirt 22 to unfold to a position completely surrounding the building except for opening 28, as shown in FIG. 5.

Figure 6:
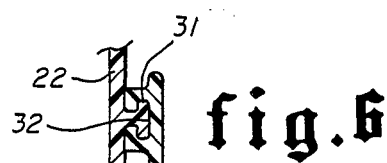
FIG. 6 is a detail sectional view taken on the line 6—6 of FIG. 5 showing the waterproof seal between the edges of the flood protecting skirts shown in FIG. 5.

Lower peripherally extending enclosure 14 is opened as shown in FIG. 3, and lower peripheral skirt 15 is unfolded to join upper skirt 22 along the waterproof seal 30, as shown in FIGS. 5 and 6. The releasable peripheral seal is formed between upper protective skirt and lower protective skirt 15 along the lower portion of the building, as shown in FIG. 5, and the seal continues upward along the vertically extending extension or tongue portion 29 extending upwardly between opening 28 in upper skirt 22. The entire seal 30 extending vertically and then horizontally around the building provides a continuous waterproof seal between upper skirt 22 and lower skirt 15.

Lower skirt 15 is, as previously described, secured to foundation 11 by a waterproof seal as indicated at 16. Foundation 11 is impervious to penetration by water and the building is therefore completely enclosed in a waterproof cover. The waterproof cover which is provided will resist intrusion by a substantial head of water for a considerable length of time. The seal is watertight between the upper and lower peripherally extending skirts and is watertight where the lower skirt 15 is sealed to foundation 11. The enclosure is therefore sufficient to protect the building against flood waters so long as the foundation 11 is itself waterproof.

While this invention has been described fully and completely with special emphasis upon a single preferred embodiment, it should be understood that within the scope of the appended claims the invention may be practiced otherwise than as specifically described herein.

I claim:

1. A system of flood protection for a building having a foundation which is not permeable to water comprising the combination with said building of
    a lower continuous skirt of plastic film secured to said building foundation by a waterproof seal,
    means secured to said building in a fixed position enclosing and supporting said lower plastic film skirt in a rolled or folded condition adjacent to said foundation, an upper continuous skirt of plastic film secured to an upper level of said building above the maximum projected rise of flood waters, means secured to said building in a fixed position enclosing and supporting said upper plastic film skirt on said building in a rolled or folded condition at said upper level, said upper and said lower plastic film supporting means each being easily opened to permit said upper and said lower plastic film to be unrolled or unfolded toward each other, and said lower and said upper plastic film skirts each extending around said building and each having edge portions providing a waterproof seal with the other and being of a size and shape permitting said edges to be quickly joined in a water tight seal to prevent flood waters from entering said building.

2. A flood protection system according to claim 1 in which
both of said plastic film skirts substantially encircle said building.

3. A flood protection system according to claim 1 in which
both of said plastic film skirts substantially completely encircle said building,
one of said plastic film skirts has an opening adjacent to a door or window opening in said building, and
the other of said plastic film skirts includes a portion cooperable with said one plastic film skirt to provide a waterproof seal for said opening therein.

4. A flood protection system according to claim 1 in which
one of said plastic film skirts substantially encircles said building except for a space as wide as a window or door opening, and
the other of said plastic film skirts completely encircles said building and includes a portion cooperable with said one plastic film skirt to provide a waterproof seal around the peripheral edge thereof and for said open space therein.

5. A flood protection system according to claim 1 in which
said plastic film edge portions providing a waterproof seal comprise a continuous tongue or rib on one edge portion and a continuous groove on the other edge portion, and
said tongue and groove being sized to provide a self holding waterproof joint when pressed together.

6. A flood protection system according to claim 1 in which
said upper and lower supporting means comprise continuous enclosures extending around said building, each having an easily opened cover for quick release of the respective plastic film skirts to seal said building against rising flood waters.

7. A flood protection system according to claim 1 in which
said upper plastic film skirt is secured on said building above the upper window line of said building.

8. A flood protection system according to claim 1 in which
said upper and lower plastic film skirts are each supported on said building in an initially accordion pleated relation to provide for quick release to cover the threatened portion of said building to secure the same against flooding.

9. A flood protection system according to claim 1 in which
said upper and lower plastic film skirts are each supported on said building in an initially accordion pleated relation to provide for quick release to cover the threatened portion of said building,
said upper plastic film skirt is secured on said building above the upper window line of said building
said upper and lower supporting means comprise continuous enclosures extending around said building, each having an easily opened cover for quick release of the respective plastic film skirts to seal said building against rising flood waters
said plastic film edge portions providing a waterproof seal comprise a continuous tongue or rib on one edge portion and a continuous groove on the other edge portion, and
said tongue and groove being sized to provide a self holding waterproof joint when pressed together.

10. A flood protection system according to claim 9 in which
said continuous enclosures each comprises a channel shaped enclosure with an easily opened substantially continuous cover which opens in a direction permitting unfolding the respective plastic film skirts therefrom without interfering with said skirts covering the flood threatened portion of said building.

11. A flood protection system according to claim 5 including reinforcing strips extending around the edges of said waterproof seal and joined by a mechanical zipper to provide additional physical strength to said seal.

* * * * *